United States Patent [19]

Shoemaker

[11] 4,087,029
[45] May 2, 1978

[54] ALIGNMENT AND LOCKING DEVICES USED ON LOADING AND CARRYING A BOAT ON A VEHICLE ROOF

[76] Inventor: Clifford L. Shoemaker, 20632 3rd Ave. S., Seattle, Wash. 98148

[21] Appl. No.: 745,794

[22] Filed: Nov. 29, 1976

[51] Int. Cl.² .............................................. B60P 3/10
[52] U.S. Cl. ................................ 224/42.1 H; 193/38
[58] Field of Search ................... 214/450; 224/42.1 E, 224/42.1 F, 42.1 G, 42.1 H; 296/23 B; 193/38

[56] References Cited

U.S. PATENT DOCUMENTS

| | | | |
|---|---|---|---|
| 2,822,213 | 2/1958 | Smith | 296/23 B |
| 3,064,841 | 11/1962 | Ellingson | 224/42.1 H X |
| 3,155,257 | 11/1964 | Showler | 214/450 |
| 3,426,878 | 2/1969 | Campbell, Jr. et al. | 193/38 |
| 3,954,199 | 5/1976 | Grove | 214/450 |

Primary Examiner—Albert J. Makay
Attorney, Agent, or Firm—Roy E. Mattern, Jr.; Kenneth S. Kessler; David H. Deits

[57] ABSTRACT

An alignment and locking system is set forth which aids in the placement of "V" bowed boats atop carrier vehicles. A cross bar is positioned across both the front and rear of the vehicle. Attached to the front cross bar are two alignment and locking devices spaced at either end of the cross bar. Both devices have a slanting smooth surface which will force a "V" bowed boat, if it is out of alignment as it is being loaded, to correct its alignment by being forced to the center of the cross bar. After the front of the "V" bowed boat is aligned on the front cross bar, the boat is pushed forward until the rails on either side of the boat are secure under the two alignment and locking devices.

2 Claims, 5 Drawing Figures

ALIGNMENT AND LOCKING DEVICES USED ON LOADING AND CARRYING A BOAT ON A VEHICLE ROOF

BACKGROUND OF THE INVENTION

Lifting a boat on top of a carrier vehicle proves difficult for several reasons. First, the boat is heavy and awkward. Secondly, when pushing the boat on top of the carrier from behind the vehicle, it is difficult if not impossible to guide the front portion of the boat. When placing the boat on two cross bars it is often necessary to rest the front of the boat on any portion of the cross bar in the first step. Then, go to the front of the carrier vehicle in the second step and align the front of the boat. After alignment is accomplished, it is necessary to push the boat forward again. The requirement for pushing and aligning the boat can take several trips from the back to the front of the carrier vehicle.

Securing the boat after it has been placed atop the carrier vehicle has also proven difficult. Either the boat has to be perfectly aligned when being placed atop the carrier so the boat may be locked in place; or, the devices which secure the boat must be moved into place after the boat is atop the carrier.

U.S. Pat. No. 3,878,954 sets forth a mechanism which aids in the loading of a boat onto the top of a recreation vehicle. The mechanism includes a winch and pulley which aids in the pulling of the boat from the ground into place. The emphasis of U.S. Pat. No. 3,878,954 is not the alignment of the boat, but rather getting the boat on top the vehicle. In carrying out this function, it is necessary that time be spent in hooking up the boat to the mechanism. Also, the mechanism is composed of several moving parts.

U.S. Pat. No. 3,750,812 approaches the problem of raising, positioning and securing a boat on top of a carrier vehicle. A winch and rail are necessary to bring the boat atop the carrier. In this invention; also, the means of positioning and the means whereby the boat is secured require several different and distinct moving parts.

The alignment and locking system set forth herein handles the problems of loading a "V" bowed boat. First, as to guiding the boat into alignment. One of each of the alignment and locking devices are placed opposite of each other on the front cross bar. If the boat, which is being pushed from behind, is off center, the slanted extension of the device will cause the boat to slide into alignment.

The device takes advantage of the rails on either side of the boat to secure the boat to the front cross bar. Once the front of the boat is aligned, the boat is pushed forward across the two cross bars.

The locking and alignment devices are adjustable so that the rails on either side of the boat fit snuggly between the front cross bar and an extended upper platform on each of the devices.

The boat is pushed forward to a point where the rails of the boat are pushed up against a clamping platform of both the devices.

Thus, with these two permanently fixed devices, both the problem of alignment and the problem of securing the boat are corrected in reference to the front cross bar.

SUMMARY OF THE INVENTION

An alignment and locking system is set forth which solves problems connected with the loading and locking of "V" bowed boats on carrier vehicles. Alignment of the boat is difficult when the party is loading from the rear. Also, the locking of the boat when the boat is placed on top of the vehicle carrier is tedious.

The alignment and locking system set forth herein, requires a front and back cross bar which are attached to the top of the vehicle carrier. The bow of the boat during loading is first balanced on top of the back cross bar. The boat is then pushed towards the front cross bar with the bow of the boat at a higher elevation than the back of the boat being directly pushed.

If the bow of the boat is out of alignment as it is lowered towards the front cross bar, the rail of the side of the boat which is out of alignment will strike the sloping guide bar. As the bow continues to lower the bow is guided towards the center of the front cross bar and alignment.

Once the bow of the boat rests on the front cross bar, the boat is pushed forward. The alignment and locking devices allow the boat rails to fit snuggly between the front cross bar and a horizontal platform of the device. The boat continues forward until rails on either side of the boat snuggly fit against the clamping platform of the two alignment and locking devices. The rear of the boat is locked to the back cross bar by conventional hold down fasteners.

DESCRIPTION OF THE PREFERRED EMBODIMENT

Figure 1:
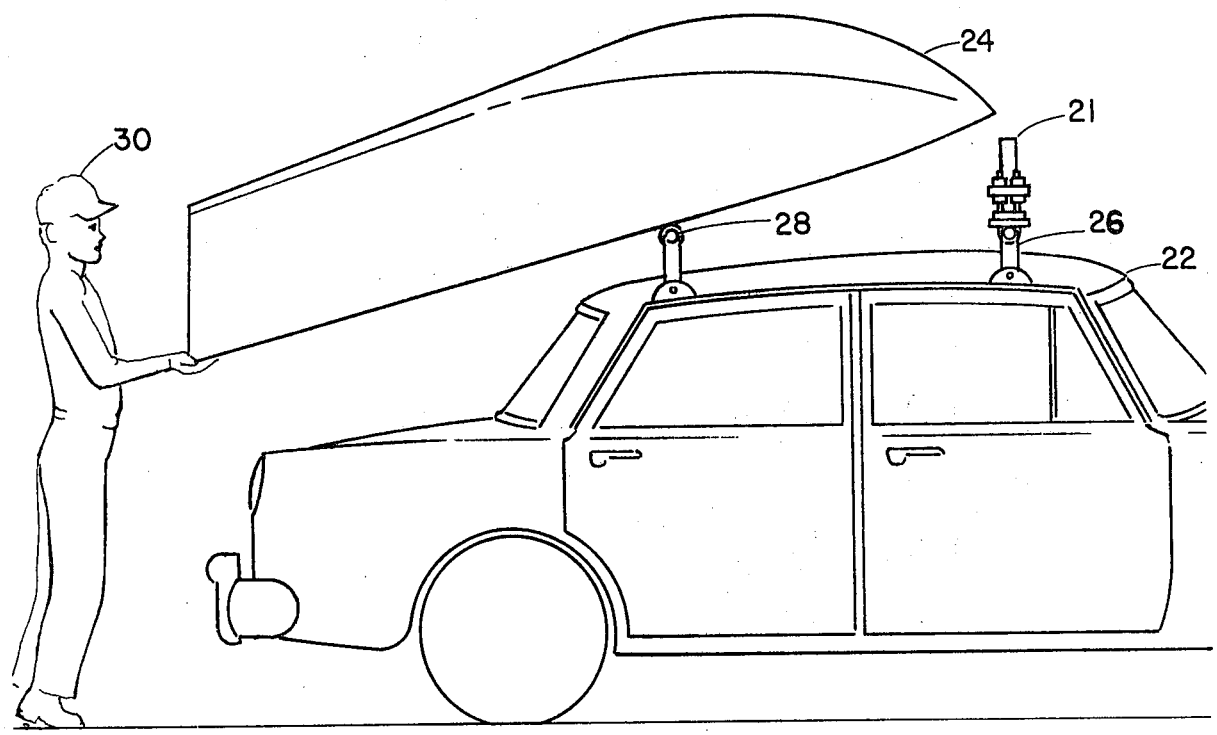
FIG. 1 is a partial side view of a "V" bowed boat being loaded on a carrier vehicle using the alignment and locking devices and conventional front and back cross bars.

A man 30 is shown loading a "V" bowed boat 24 onto a carrier vehicle 22. The front end of the "V" bowed boat 24 is first positioned on top of the back cross bar 28. After the bow of the boat 24 is placed on the back cross bar 28 the man 30 pushes the boat towards the front of the carrier vehicle. As the boat is first pushed on top of the carrier vehicle 22 the bow of the boat 30 continues to be at a higher elevation than the back of the boat and the back cross bar 28.

When it is judged that the bow of the boat extends beyond the front cross bar 26 the bow of the boat 30 is allowed to drop in elevation towards the front cross bar 26 and generally it is off the center line.

Since the boat 24 is being manually placed on the carrier vehicle 22 from the rear, it is difficult for the person 30 to properly align the boat 24 equidistant between the ends of the front cross bar 28. Thus, as shown in FIG. 2, the boat 24 might be misaligned towards the left or right side of the front cross bar 26.

Figure 2:
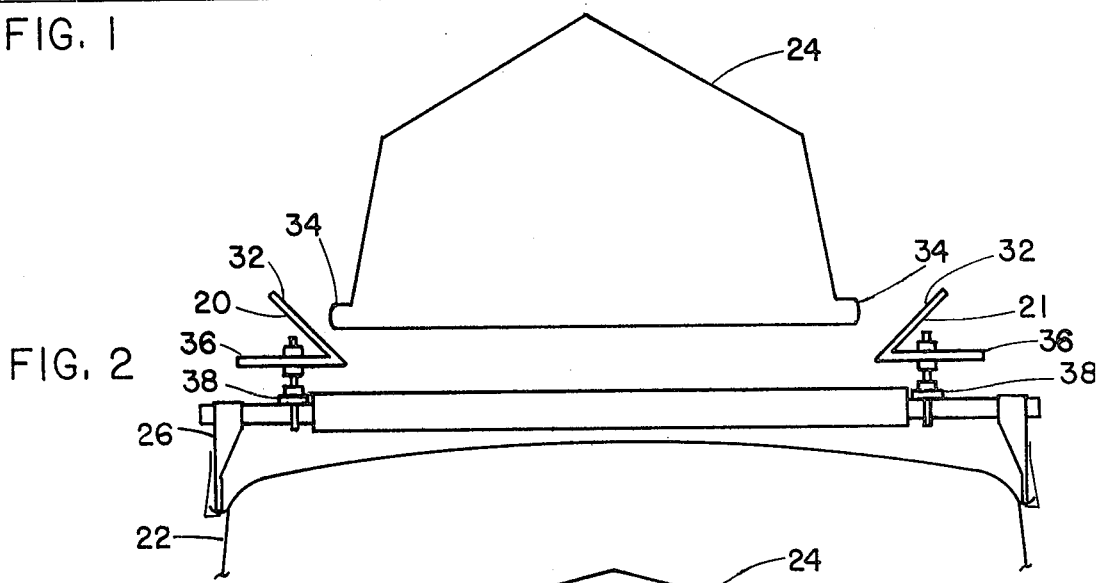
FIG. 2 is a partial front view of a "V" shaped boat out of alignment as it clears the front cross bar and being aligned.
Figure 3:
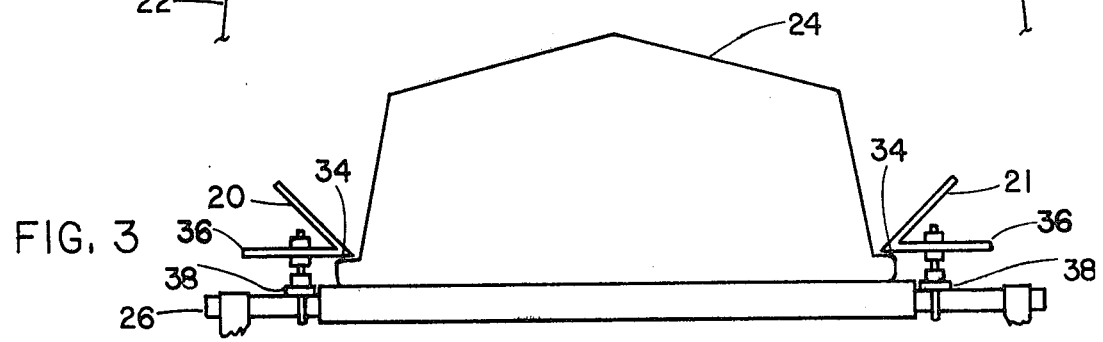
FIG. 3 is a partial front view of the boat in alignment and pushed to its forward limit and thereby secured in a locked position on the front cross bar.
Figure 4:
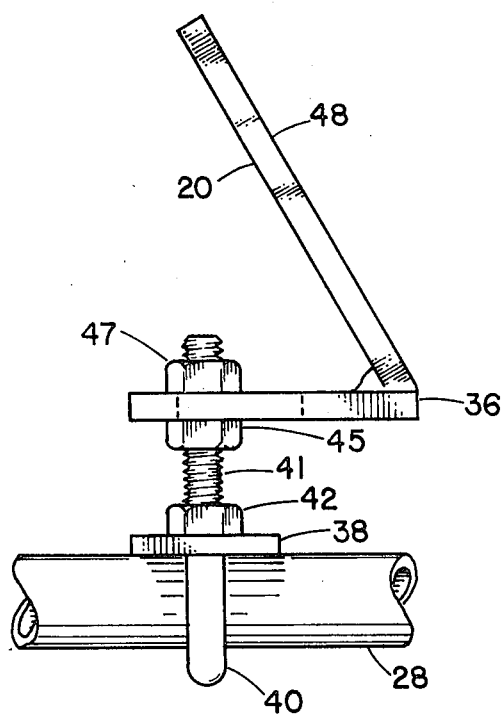
FIG. 4 is a partial view of one of the alignment and locking devices secured to the front cross bar, as viewed from the front of the carrier vehicle.
Figure 5:
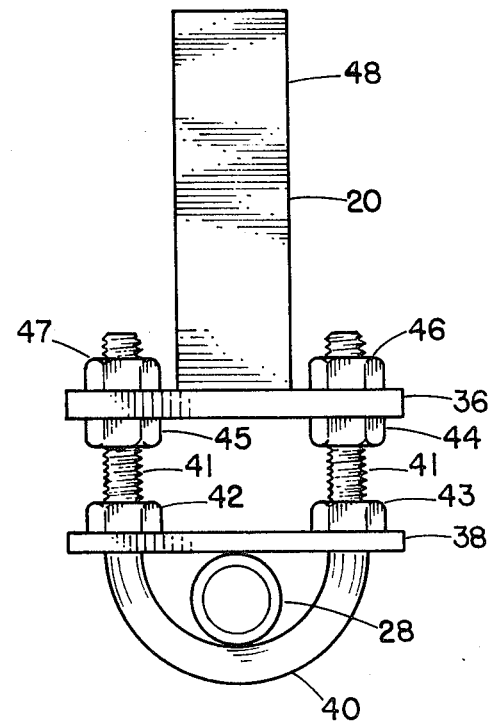
FIG. 5 is a partial view of one of the alignment and locking devices secured to the front cross bar as viewed from the side of the carrier vehicle.

FIG. 2 shows the boat 24 biased towards the center by the alignment and locking device 20 as one side of the bow of the boat 24 contacts the sloping guide bar 32 as the bow of the boat 24 is being lowered.

As the boat 24 continues to be lowered and moved towards the front cross bar 26, the sloping guide bar 32 causes the boat 24 to slide towards proper alignment between the alignment and locking devices 20, 21, until both sides of the bow of the boat 24 completely rest on the front cross bar 26.

Once the bow of the boat 24 rests on the front cross bar 26, the person 30 may push the boat 24 forward until the boat rails 34 contact the horizontal platforms 36 of the respective alignment and locking devices 20, 21, thereby stopping the forward progress of the boat 24.

The alignment and locking devices 20 and 21 are attached to the front cross bar 26 by a "U" bolt 40. The distance between alignment and locking devices 20 and 21 determines the point at which the boat 24 will be stopped in its forward progress as the boat rails 34 strike the horizontal platforms 36. Thus, the distance between the alignment and locking devices 20 and 21 also determines the overall position and balance of the boat 24 as it rests on both the front cross bar 26 and the back cross bar 28.

The alignment and locking devices 20 and 21 are installed by placing the "U" bolt 40 around the front cross bar 26 leaving the threaded prongs 41 of the "U" bolt 40 pointing upwardly away from the vehicle carrier 22. A clamping platform 38 with holes conforming to the prongs 41 of the "U" bolt 40 is placed down over the prongs 41 and in contact with the top of the front cross bar 26. Thereafter, nuts 42 and 43 are threaded on both prongs and turned down to secure both the clamping platform 38 and the "U" bolt 40 tightly against front cross bar 26.

The thickness of the boat rails 34 determines the distance at which nuts 44 and 45 are threaded down on the "U" bolt 40. Nuts 44 and 45 are placed at a distance whereby the width of the boat rail 34 will snuggly conform to the distance between front cross bar 26 and the horizontal platform 36 located at the terminus of the sloping guide bar 32 on the respective alignment and locking devices 20 and 21.

Nuts 46 and 47 are threaded on either side of the "U" bolt 40 and hold the horizontal platform 36 tightly against nuts 44 and 45.

Preferably, the sloping guide bar extension 48 is affixed to the horizontal platform 36 at a sufficiently steep angle to cause the boat 24 to slide down under control towards the center of the front cross bar 26. The horizontal platform 36 and sloping guide bar extension 48 may be two members affixed as shown in the preferred embodiment or they may originally be formed as one single member.

After installation, nuts 42 and 43 may be loosened allowing the alignment and locking devices 20 and 21 to be loosened and adjusted to meet possible varying widths of a new boat 24. Preferably at all times, a boat 24 is secured to the back cross bar 28 by using conventional fasteners.

I claim:

1. Alignment and locking devices each paired with another arranged in opposite hand and used when loading a V bow boat having externally extending rails, on front and back cross supports in turn secured to a top of a carrier vehicle, each alignment and locking device comprising:
    a. combined sloping guide bar and a horizontal platform with spaced holes, the sloping guide bar to direct a boat toward the midpoint between the paired alignment and locking devices, and the horizontal platform, in addition to positioning the sloping guide bar, being also arranged to clearly extend toward the centerline of a vehicle in sufficient distance to bear down against a boat rail;
    b. a fastening assembly to secure the combined sloping guide bar and horizontal platform at a spaced distance above a front cross support bar to accommodate the restrictive confinement of a boat rail between the horizontal platform and a front cross support bar, after the V bow of a boat has been aligned with a midpoint between the opposite hand alignment and locking devices and moved forwardly to be snugly locked until pulled backwardly, comprising:
        1. a U bolt positioned with its lower U portion immediately below a front cross bar and with its threader prongs directed upwardly away from a top of a vehicle;
        2. a clamping platform with spaced holes fitted down over the upwardly directed threaded prongs of the U bolt for securement against a top of a front cross bar;
        3. fastening nuts threaded on the upwardly directed threaded prongs of the U bolt and tightened to hold the clamping platform and the U bolt against a front cross bar; and
        4. additional fastening nuts also threaded on the upwardly directed prongs of the U bolt and spaced as a group above the clamping platform, and also arranged adjacent respective top and bottom surfaces at the spaced holes of the horizontal platform, and thereafter tightened against the horizontal platform to position it at a selected distance above a front cross bar.

2. An alignment and locking device, as claimed in claim 1, wherein the sloping guide bar is of a width which is less than the distance between the prongs of the U bolt which allows for ease in tightening the nuts which secure the horizontal platform.

* * * * *